United States Patent [19]

Kull

[11] 4,187,881

[45] Feb. 12, 1980

[54] CONE VALVE ASSEMBLY

[75] Inventor: George A. Kull, St. Charles, Mo.

[73] Assignee: ACF Industries, Incorporated, New York, N.Y.

[21] Appl. No.: 918,231

[22] Filed: Jun. 23, 1978

[51] Int. Cl.² .................. F16K 31/53; F16K 31/54
[52] U.S. Cl. .................. 137/625.31; 251/144; 137/797; 137/13
[58] Field of Search .......... 251/144; 137/625.31, 137/797, 13; 406/138

[56] References Cited

U.S. PATENT DOCUMENTS

| 957,097 | 5/1910 | Restucci | 137/625.31 |
| 1,956,101 | 4/1934 | Le Noir | 137/625.31 X |
| 2,878,829 | 3/1959 | Folmsbee | 137/625.18 X |
| 3,084,001 | 4/1963 | Loomis | 406/138 |
| 3,421,544 | 1/1969 | Bozoyan | 137/625.31 X |

Primary Examiner—Arnold Rosenthal

Attorney, Agent, or Firm—Henry W. Cummings

[57] ABSTRACT

In accordance with the present invention, a container outlet valve assembly is provided surrounding a container outlet including a generally cone-shaped housing extending upwardly into the container, and including radially spaced outer openings in the cone for lading to flow out of the container. A cone valve is located within the housing containing spaced openings which align with the outer openings in the cone housing when the cone valve is in open position. A liner of low friction material is attached to the outer surface of the cone valve and/or the inner surface of the cone housing. The cone valve is rigidly attached to a vertically extending shaft which is journaled for rotation in a bearing in the cone housing. A hub extends radially outwardly from the lower portion of the shaft to the cone valve. The cone valve is rotatable to a closed position in which the valve body closes the openings located in the cone valve housing.

9 Claims, 8 Drawing Figures

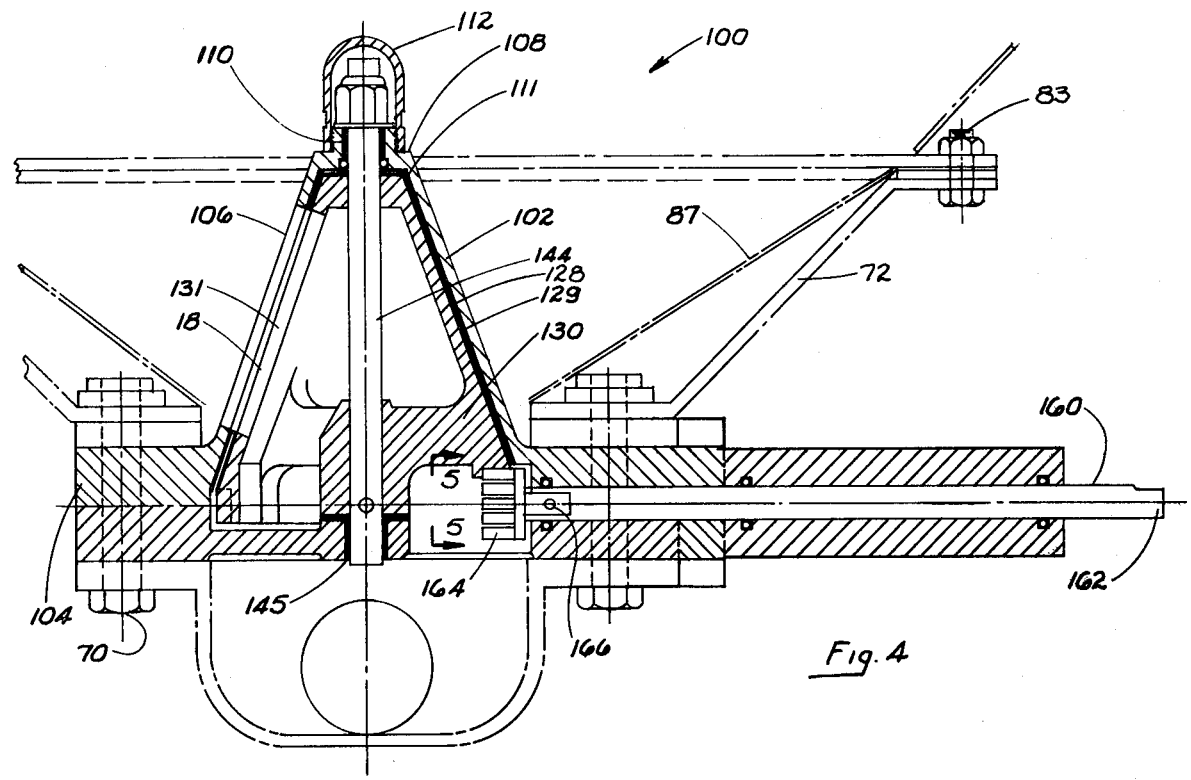
Fig. 4
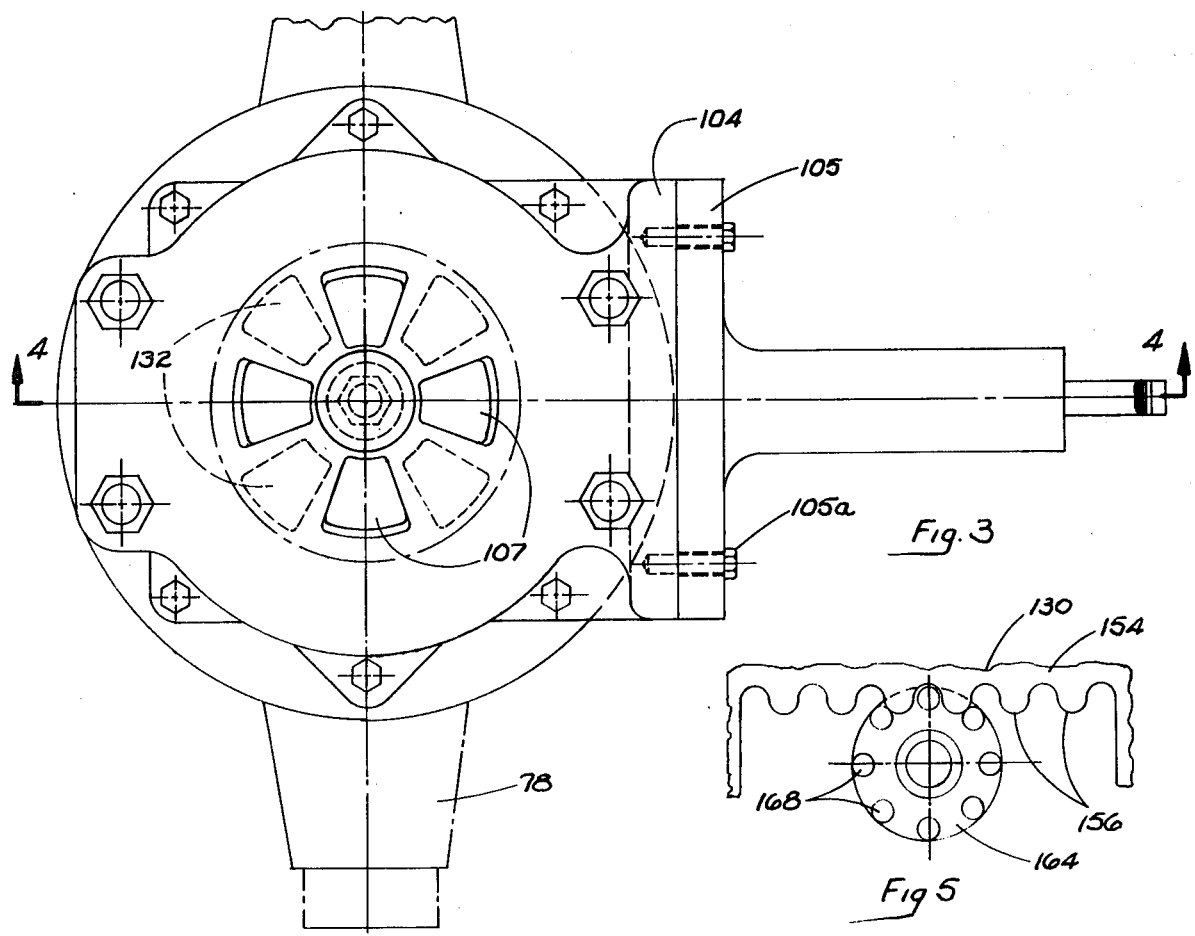
Fig. 3
Fig. 5

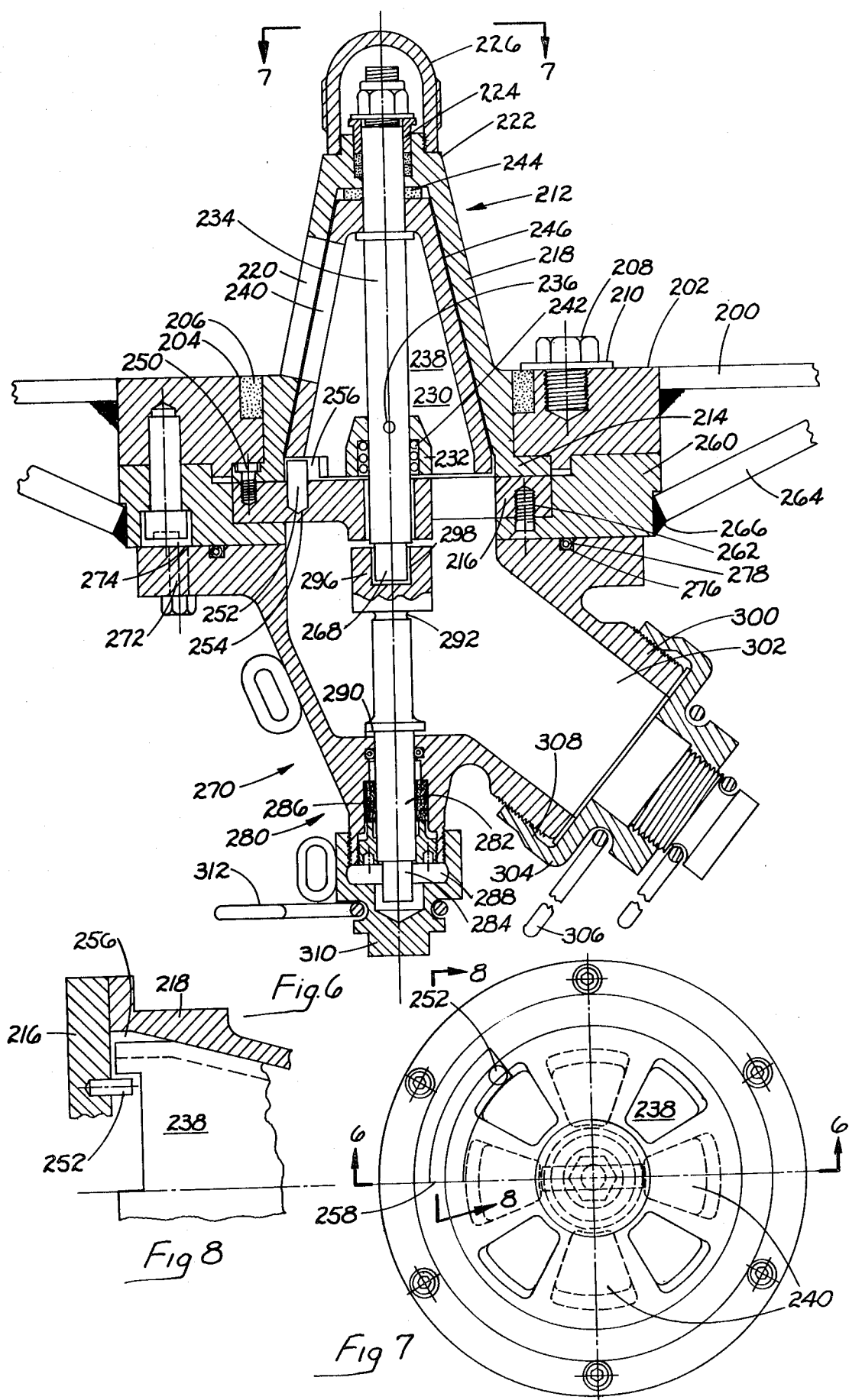

CONE VALVE ASSEMBLY

BACKGROUND OF THE INVENTION

Butterfly valves are used in many container outlets and in railway hopper car and tank car outlets.

However, to open most butterfly outlets, the operator must overcome the weight of the lading as the valve is rotated from a horizontal position, closing the outlet, to a vertical position allowing lading discharge.

In U.S. Pat. No. 2,878,829 (1959), a circular plate containing a pair of spaced openings is disclosed which in open position align with channels or passageways in a housing located on top of a railway tank car. One channel or passageway constitutes a siphon conduit outlet. The other passageway constitutes a tank car vent port. The circular plate is moved between open and closed positions by a pinion which engages rack teeth located on the external surface of the circular plate.

However, the flat surfaces of the housing and circular plate would not be adapted for use as a lading outlet valve in the bottom of the tank. Particulate and viscous ladings would tend to cause the circular plate to bind against the housing, making the outlet difficult or impossible to open.

SUMMARY OF THE INVENTION

The object of the present invention is to provide a container outlet in which the operator does not have to lift the valve against the weight of the lading to move the valve from closed to open position.

Another object of the present invention is to provide an outlet assembly which sheds lading, and thus tends to reduce sticking and binding between the outlet housing and the unloading valve.

In accordance with the present invention, a container outlet valve is provided surrounding a container outlet including a generally cone shaped housing extending upwardly into the container including radially spaced outer openings in the cone housing for lading to flow out of the container. A cone valve is located within the housing containing spaced openings which align with the outer openings in the cone housing when the cone valve is in open position. A liner of low friction material is attached to the outer surface of the cone valve and/or the inner surface of the cone housing. The cone valve is rigidly attached to a vertically extending shaft which is journaled for rotation in a bearing in the cone housing. A hub extends radially outwardly from the lower portion of the shaft to the cone valve.

The cone valve is rotatable from the open position to a closed position in which the valve body closes the openings located in the cone valve housing.

In one embodiment rack teeth are provided in the external surface of the hub which are engaged by a pinion to rotate the cone valve between open and closed positions. In another embodiment, the shaft includes a lower connection portion which is engaged by a lower operator extending below the cone housing. Preferably an unloading spout is attached to the container below the cone-shaped housing, and the lower operator extends through the spout and is rotated by attaching a tool to the lower operator below the spout.

Preferably, the unloading spout and lower operator are designed to shear off and/or drop off in the event of severe impact to the spout, while the cone valve remains in closed position, preventing the escape of lading in the event of such an impact.

THE DRAWINGS

FIG. 3 is a plan view of another embodiment of the present invention.

FIG. 4 is a sectional view looking in the direction of the arrows along the line 4—4 in FIG. 3.

FIG. 5 is a view looking in the direction of the arrows along the line 5—5 in FIG. 4.

FIG. 6 is a sectional view looking in the direction of the arrows along the line 6—6 in FIG. 7.

FIG. 7 is a plan view looking in the direction of the arrows along the line 7—7 in FIG. 6.

FIG. 8 is a sectional view looking in the direction of the arrows along the line 8—8 in FIG. 7.

DESCRIPTION OF PREFERRED EMBODIMENTS

Figure 1:
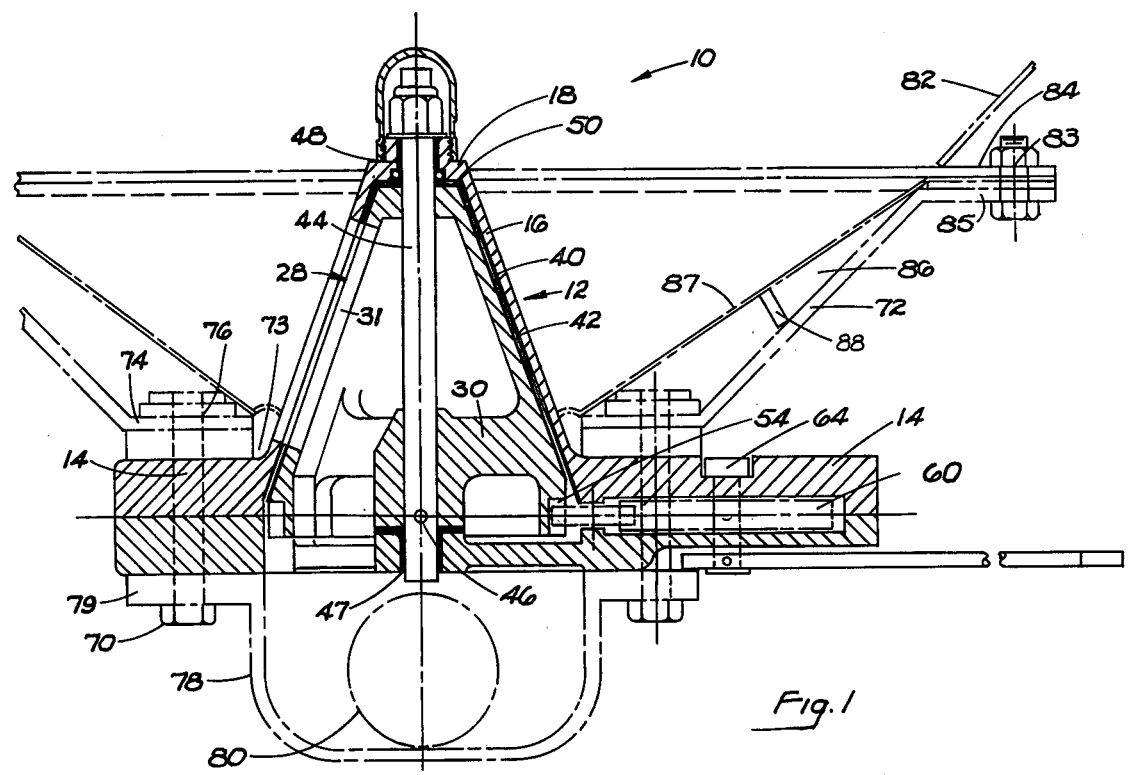
FIG. 1 is a vertical sectional view looking in the direction of the arrows along the line 1—1 in FIG. 2.

In one embodiment the cone valve assembly is indicated at 10. The cone valve includes a housing 12 generally of cone shape. The housing includes a flange portion 14 to attach the cone valve to a container or outlet 72 having a discharge opening 73. Housing 12 includes a cone portion 16 extending upwardly to a top portion 18. In the cone portion 16 a plurality of cone openings 20, 22, 24 and 26 (FIG. 2) are provided.

Figure 2:
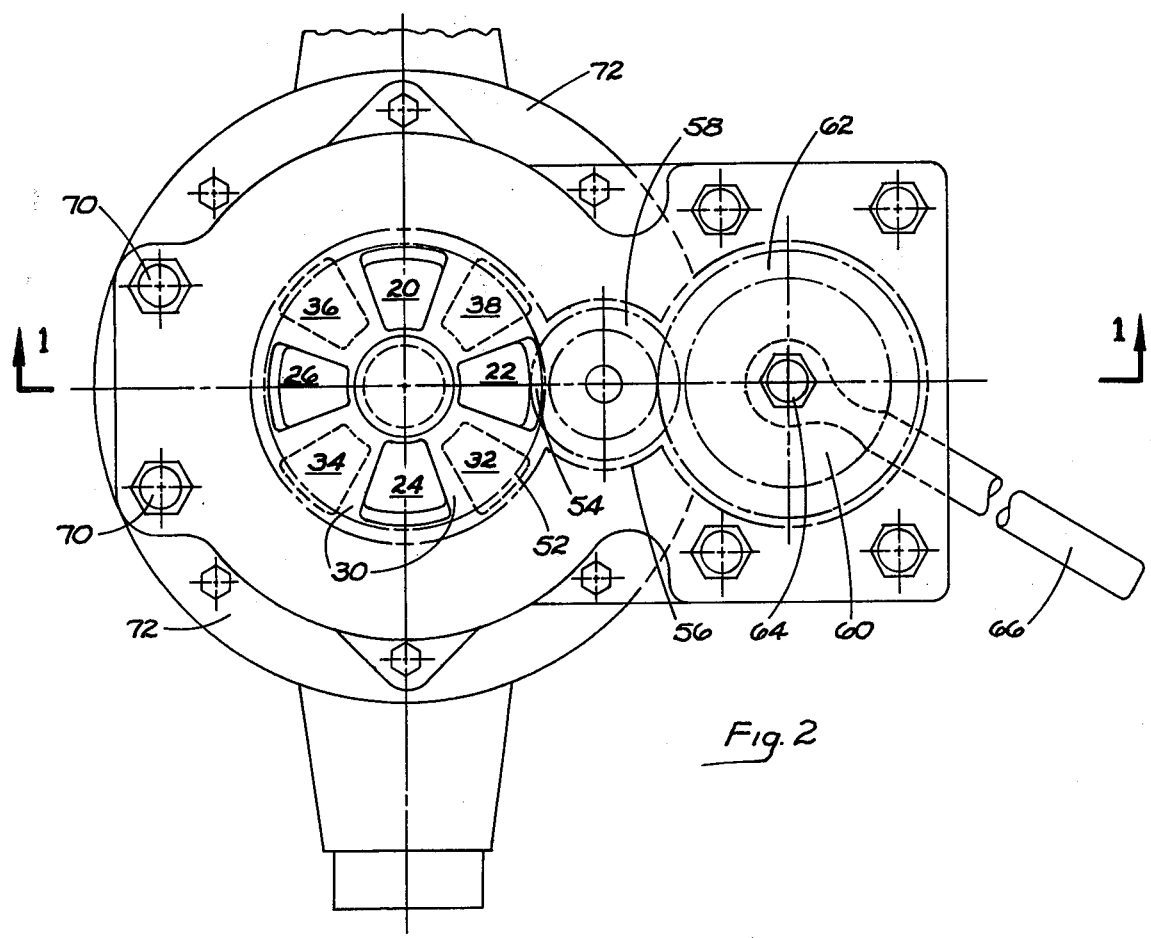
FIG. 2 is a plan view of the embodiment of the invention shown in FIG. 1.

A cone valve indicated generally at 28 includes a lower base portion or hub 30 and a valve body portion 31. Valve body portion 31 includes body portions 32, 34, 36 and 38 (FIG. 2). A liner of low friction material 40 is attached to housing cone portion 16. An example of a suitable material for this purpose is polytetrafluoroethylene. If desired a layer of low friction material 42 may also be attached to the cone valve 28.

Hub 30 is attached to a vertically extending shaft 44, for example, by means of a drive pin 46. Shaft 44 is journaled in a lower bearing 47 and in cone housing upper portion 18 by means of a bearing 48. A seal 50 is provided above bearing 48 to seal cone valve 28 with respect to housing 12.

Hub 30 includes an outer surface 52 having rack teeth 54 formed therein. A pinion gear 56 includes cooperating gear teeth 58. An operating gear 60 includes gear teeth 62 which engage pinion gear teeth 58. Operating gear 60 is rotably mounted about a pin 64. An operating handle 66 extending outwardly from cone valve housing 12 is used to rotate operating gear 60 and pinion gear 56. This in turn moves cone valve 28 between open and closed positions relative to housing 16. In closed position, cone valve segments 32, 34, 36 and 38 align respectively with openings 20, 22, 24 and 26 in cone housing 12 to prevent lading from leaving the container. In open position valve segments 32, 34, 36 and 38 are in the position shown in dotted lines in FIG. 2 which enables lading to pass through openings 20, 22, 24 and 26 in the housing and pass out of the container.

Fasteners 70 are used to attach the outlet assembly 10 to an outlet 72 having a flange 74 with openings therein 76 to receive fasteners 70. A discharge conduit 78 having a flange 79 and a discharge port 80 is also held in place with fasteners 70 or other suitable connecting means. Outlet 72 may be connected to a railway hopper car or tank car indicated at 82 with fasteners 83 joining abutting flanges 84 and 85 (FIG. 1).

The outlet could also be attached to an overland truck or inter-modal container in a similar manner.

Furthermore a plenum chamber 86 may be provided including porous membrane 87 held in place by spacers 88, flanges 84 and 85 and fasteners 83. This type of plenum chamber construction is conventional, and is included only to indicate that the cone valve assembly of the present invention may be utilized in fluidized unloading. A conduit (not shown) is used to supply air to plenum chamber 86. The air passes through porous membrane 87 and fluidizes the lading within outlet 72. When the cone valve is in open position (FIG. 1) the fluidized lading passes into discharge conduit 78 and out through discharge port 80 through a conduit (not shown) to a suitable container or transportation vehicle.

The embodiment shown in FIGS. 3 through 5 is similar to the embodiment shown in FIGS. 1 and 2. A cone valve assembly 100 includes a cone valve housing 102 including a flange portion 104 and a cone portion 106 including a plurality of openings 107 and having a top portion 108. A bearing 110 and a seal 111 are provided in the top portion. A curved dome or cap 112 is provided which sheds the lading more readily than the cone housing top 18.

A cone valve 128 includes a bottom or hub portion 130 and a valve body portion 131 which in closed position prevents lading from entering housing 106. Openings 132 are provided which align with openings 107 in open position. At least one layer of low friction material 129 is provided between valve 128 and housing 102.

A shaft 144 attached to hub 130 is journaled in bearings 111 and 145. As shown in FIG. 5, hub 130 includes an external lower surface 154 having rack teeth therein 156. An operating shaft 160 includes an external connection portion 162. A pinion 164 is attached to shaft 160 with a pin 166. Pinion 164 includes pinion pins 168 which drivably engage teeth 156 to move hub 130 and cone valve 128 between open and closed positions. Housing flange portion 104 includes an extension 105 which supports shaft 162 for rotation. Fasteners 105a hold extension 105 in place on housing flange portion 104. Fasteners 70 hold in place an outlet 72 and a permeable membrane 87 to form a plenum chamber as described above. This embodiment otherwise operates in the same manner as the previous embodiment.

In still another embodiment illustrated in FIG. 6, a tank car bottom 200 is welded to a universal flange 202. Universal flange 202 includes a slot 204 into which is inserted a Teflon ring 206. Teflon ring 206 is held in place with a capscrew 208 having a flange portion 210 which engages the upper surface of the ring.

A cone valve housing 212 includes a flange portion 214 and base portion 216. Housing 212 further includes a cone portion 218 having radially spaced openings 220 as described in the previous embodiments. A cone top portion 222 includes a bearing 224 and a curved cap or dome 226 adapted to shed the lading.

A cone valve 230 includes a base portion or hub 232 attached to a shaft 234 with a pin 236. Cone valve 230 further includes a valve body 238 having openings 240. In open position openings 240 align with openings 220 for lading to flow in and out of the valve. In closed position valve body portion 238 aligns with openings 220 to prevent the entrance of lading.

Shaft 234 is urged into an upward position by means of a tension spring 242. Teflon bearing 244 and a liner of low friction material 246 are provided between cone housing and cone valve 230.

Housing base portion 216 is connected to housing flange 214 with fasteners 250. A pin 252 is inserted by a press fit into an opening 254 in housing base portion 216. A slot 256 is provided in the hub 232 of cone valve 230 (FIG. 8). A wall 258 provides another stop for the movement of cone valve 230. Thus cone valve 230 is rotated in a clockwise direction in FIG. 7 to align openings 220 and 240 to discharge lading. Cone valve 230 is rotated in a counterclockwise direction to align valve body portion 238 with openings 220 to prevent discharge of lading.

Base portion 216 is attached to a mating flange 260 with fasteners 262. A skid 264 constructed according to the teachings of application Ser. No. 860,987 filed Dec. 15, 1977, hereby incorporated into the present application by this reference, is attached to mating flange 260 with weld 266.

Shaft 234 includes a lower connection portion 268. An unloading spout 270 constructed according to the teachings of application Ser. Nos. 804,664 and 804,663, filed June 8, 1977, hereby incorporated into the present invention by this reference, is attached to mating flange 260 with fasteners 272. Fasteners 272 are provided with a shearable portion 274 by means of a groove or by means of their cross section. A seal 276 is provided in a slot 278 to seal spout 270 with respect to mating flange 260.

A lower operator 280 includes a shaft 282 having a lower connection portion 284 extending through a bearing 286 held in place with a packing nut 288. Operator 280 further includes a thrust bearing 290 and a shear groove 292. An upper connection portion 296 engages with clearance 298 lower connection portion 268 of shaft 234.

An unloading spout 300 includes an opening 302 closed by a cap 304 having a chain 306 attached thereto to attach the cap to a portion of the container to prevent loss thereof when the cap is removed for unloading. A threaded fitting 308 is provided between the cap and the spout 300.

An additional cap 310 is provided below connection portion 284 having a chain 312.

Removal of caps 304 and 310 prepares the outlet for unloading. A suitable unloading conduit or discharge device (not shown) is attached to threaded fitting 308. Attachment of a suitable tool to connection portion 284 rotates shaft 282 and shaft 234. This moves openings 240 from the dotted position shown in FIG. 7 to the open position shown in FIG. 6 wherein openings 220 and 240 align and lading will flow out through spout 302. In open position cone valve 230 engages pin stop 252. Rotation of shafts 282 and 234 in the opposite direction moves cone valve in a counterclockwise direction in FIG. 7 until the openings 240 assume the position shown in FIG. 7 wherein valve body 238 covers openings 220, preventing entrance of the lading.

What is claimed is:

1. A container outlet valve assembly comprising: a generally cone-shaped housing surrounding a container opening; said housing extending upwardly into the container, and including radially spaced outer openings in the cone housing for lading to flow out of the container; a cone valve located within the housing containing spaced valve openings which align with the housing outer openings when the cone valve is in open position; a liner of low-friction material attached to one of the outer surface of the cone valve and/or the inner surface of the cone housing; said cone valve being rigidly attached to a vertically extending shaft which is journaled for rotation in a bearing in the cone housing; said cone valve being rotatable between a closed position in which the valve body closes the openings located in the cone valve housing, and an open position wherein the valve openings align with the housing openings to allow lading to flow out of the container.

2. A container outlet valve assembly according to claim 1 wherein said cone valve includes a hub extending radially outwardly from the lower portion of the shaft.

3. A container outlet valve assembly according to claim 2 wherein rack teeth are provided in the external surface of the hub which are engaged by a pinion to rotate the cone valve between open and closed positions.

4. A container outlet valve assembly according to claim 1 wherein said shaft includes a lower connection portion which is engaged by a lower operator extending below the cone housing.

5. A container outlet valve assembly according to claim 4 wherein an unloading spout is attached to the container below the cone shaped housing, and the lower operator extends through the spout and includes a connecting portion for attaching a tool to the lower operator below the spout.

6. A container outlet valve assembly according to claim 5 wherein means are provided for the unloading spout and lower operator to shear off and/or drop off from said outlet in the event of severe impact to the spout, while the cone valve remains in closed position, preventing the escape of lading in the event of such an impact.

7. A container outlet valve assembly according to claim 1 wherein a plenum chamber is provided in said outlet and wherein air is circulated through said plenum chamber to fluidize the lading, and wherein fluidized lading is discharged through said cone valve in open position.

8. A container outlet valve assembly comprising: a generally cone shaped housing surrounding a container opening; said housing extending upwardly into the container, and including radially spaced outer openings in the cone housing for lading to flow out of the container; a cone valve located within the housing containing spaced valve openings which align with the housing outer openings when the cone valve is in open position; a liner of low friction material attached to one of the outer surface of the cone valve and/or the inner surface of the cone housing; said cone valve being rigidly attached to a vertically extending shaft which is journaled for rotation in a bearing in the cone housing; said cone valve being rotatable between a closed position in which the valve body closes the openings located in the cone valve housing, and an open position wherein the valve openings align with the housing openings to allow lading to flow out of the container; an unloading spout attached to the container below said cone shaped housing with fasteners which define a shear plane and a lower operator extending through the spout and including an upper connecting portion for attaching the lower operator to said shaft; said lower operator adapted to shear off or drop off on or below said shear plane; and whereby a tool may be attached to the lower operator to rotate said shaft and move said cone valve between open and closed positions.

9. A container outlet valve assembly according to claim 8 wherein a skid is attached to said valve assembly above said shear plane to protect said cone valve from impacts applied to said cone valve above said shear plane.

* * * * *